(12) United States Patent
Reuter et al.

(10) Patent No.: US 7,412,823 B2
(45) Date of Patent: Aug. 19, 2008

(54) LNT DESULFATION STRATEGY

(75) Inventors: Johannes Walter Reuter, Ypsilanti, MI (US); James Edward McCarthy, Jr., Canton, MI (US)

(73) Assignee: Eaton Corporation, Cleveland, OH (US)

(*) Notice: Subject to any disclaimer, the term of this patent is extended or adjusted under 35 U.S.C. 154(b) by 215 days.

(21) Appl. No.: 11/455,553

(22) Filed: Jun. 19, 2006

(65) Prior Publication Data
US 2007/0125073 A1    Jun. 7, 2007

Related U.S. Application Data

(63) Continuation-in-part of application No. 11/293,065, filed on Dec. 2, 2005.

(51) Int. Cl.
*F01N 3/00* (2006.01)

(52) U.S. Cl. .............................. 60/295; 60/285; 60/286

(58) Field of Classification Search ................ 60/285, 60/286, 295
See application file for complete search history.

(56) References Cited

U.S. PATENT DOCUMENTS

| | | | |
|---|---|---|---|
| 5,974,788 A | 11/1999 | Hepburn et al. | |
| 6,138,453 A | 10/2000 | Sawada et al. | |
| 6,164,064 A | 12/2000 | Pott | |
| 6,732,507 B1 | 5/2004 | Stanglmaier et al. | |
| 6,745,560 B2 * | 6/2004 | Stroia et al. | 60/286 |
| 6,832,473 B2 | 12/2004 | Kupe et al. | |
| 6,938,411 B2 | 9/2005 | Hoffmann et al. | |
| 7,082,753 B2 * | 8/2006 | Dalla Betta et al. | 60/286 |
| 7,165,393 B2 * | 1/2007 | Betta et al. | 60/286 |
| 2003/0101713 A1 | 6/2003 | Dalla Betta et al. | |
| 2004/0050037 A1 | 3/2004 | Betta et al. | |
| 2007/0079605 A1 | 4/2007 | Hu et al. | |
| 2007/0125072 A1 | 6/2007 | McCarthy, Jr. et al. | |
| 2007/0125073 A1 | 6/2007 | Reuter | |

FOREIGN PATENT DOCUMENTS

WO    WO 2004/090296    10/2004

* cited by examiner

*Primary Examiner*—Thomas Denion
*Assistant Examiner*—Loren Edwards
(74) *Attorney, Agent, or Firm*—Paul V. Keller

(57) ABSTRACT

A fuel reformer is configured in an exhaust line upstream of a LNT. To desulfate the LNT, over a first period, fuel is provided to the exhaust to make the exhaust rich. While producing reformate, the reformer is allowed to heat to a relatively large extent, typically at least about 75° C. Before the reformer overheats, the provision of fuel is reduced and typically stopped entirely for a second period, over which the reformer cools. The heating and cooling periods are repeated to complete the desulfation process. The reduced efficiency of operating the reformer over an extended temperature range is more than compensated for by the benefits of extending the rich pulse.

10 Claims, 4 Drawing Sheets

LNT DESULFATION STRATEGY

PRIORITY

This application is a continuation-in-part of U.S. application Ser. No. 11/293,065, filed Dec. 2, 2005, which is incorporated herein by reference in its entirety.

FIELD OF THE INVENTION

The present invention relates to pollution control systems and methods for diesel and lean burn gasoline engines.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons.

LNTs are devices that adsorb NOx under lean exhaust conditions and reduce and release the adsorbed NOx under rich condition. A LNT generally includes a NOx adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time-to-time to regenerate (denitrate) the LNT.

A LNT can produce ammonia during denitration. Accordingly, it has been proposed to combine a LNT and an ammonia-SCR catalyst into one system. Ammonia produced by the LNT during regeneration is captured by the SCR catalyst for subsequent use in reducing NOx, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat is provided through the same types of reactions as used to remove excess oxygen from the exhaust. The temperature of the LNT is generally controlled during desulfation as the temperatures believed to be required for desulfation are generally close to those at which the LNT catalyst undergoes thermal deactivation.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. The transmission gear ratio can be changed to shift the engine to an operating point that produces equal power but contains less oxygen. However, at least in the case of a diesel engine, it is generally necessary to eliminate some of the oxygen in the exhaust by combustion or reforming reactions with reductant that is injected into the exhaust.

The reactions between reductant and oxygen can take place in the LNT, but it is generally preferred for the reactions to occur in a catalyst upstream of the LNT, whereby the heat of reaction does not cause large temperature increases within the LNT at every regeneration.

Reductant can be injected into the exhaust by the engine or a separate fuel injection device. For example, the engine can inject extra fuel into the exhaust within one or more cylinders prior to expelling the exhaust. Alternatively, or in addition, reductant can be injected into the exhaust downstream of the engine.

U.S. Pat. No. 6,832,473 describes a system wherein the reductant is reformate produced outside the exhaust stream and injected into the exhaust as needed. During desulfations, the reformate is injected upstream of an oxidation catalyst. Heat generated by combustion of the reformate over the oxidation catalyst is carried by the exhaust to the LNT and raises the LNT to desulfations temperatures.

U.S. Pat. Pub. No. 2004/0050037 (hereinafter "the '037 application") describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate. For desulfations, heat produced by the reformer is used to raise the LNT to desulfations temperatures.

WO 2004/090296 describes a system wherein there is an inline reformer upstream of a LNT and a SCR catalyst. The reformer has a high thermal mass and is intended to operate at exhaust gas temperatures.

The operation of an inline reformer can be modeled in terms of the following three reactions:

$$0.684 CH_{1.85} + O_2 \rightarrow 0.684 CO_2 + 0.632 H_2O \quad (1)$$

$$0.316 CH_{1.85} + 0.316 H_2O \rightarrow 0.316 CO + 0.608 H_2 \quad (2)$$

$$0.316 CO + 0.316 H_2O \rightarrow 0.316 CO_2 + 0.316 H_2 \quad (3)$$

wherein $CH_{1.85}$ represents an exemplary reductant, such as diesel fuel, with a 1.85 ratio between carbon and hydrogen. Equation (1) is exothermic complete combustion by which oxygen is consumed. Equation (2) is endothermic steam reforming. Equation (3) is the water gas shift reaction, which is comparatively thermal neutral and is not of great importance in the present disclosure, as both CO and $H_2$ are effective for regeneration.

The inline reformer of the '037 application is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby Reaction (1) takes place. After warm up, the fuel injection rate is increased to provide a rich exhaust. Depending on such factors as the exhaust oxygen concentration, the fuel injection rate, and the exhaust temperature, the reformer tends to either heat or cool as reformate is produced.

In theory, the temperature of the reformer can be controlled through the fuel injection rate. For example if the reformer is heating, the fuel injection rate can be increased to increase the extent of Reaction (2) (endothermic steam reforming) while the extent of Reaction (1) (exothermic complete combustion), which is limited by the exhaust oxygen concentration, remains essentially constant. In practice, this approach often cannot be used. The size and catalyst loading of the reformer are limited for economic reasons, among others, and the efficiency of the fuel reformer is generally insufficient to accommodate high fuel injection rates. As a result, the reformer tends to heat as reformate is being produced, particularly when exhaust oxygen concentrations are in the 8-15% range.

One approach suggested by the '037 application for controlling this heating is to pulse the fuel injection. The reformer is allowed to cool between pulses. In this manner, the reformer can be kept at a desired temperature while a LNT regeneration completes. A desired temperature is, for example, 600° C.±50° C.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

An object of the invention is to provide a better method of desulfating a LNT configured downstream of a fuel reformer in an internal combustion engine exhaust system. This object is achieved by extending the lengths of the rich pulses and allowing the reformer temperature to vary widely when pulsed injection is used to prevent the reformer from overheating. Extending the lengths of the rich pulses significantly reduces the extent to which reformate is oxidized with oxygen provided during the lean phases. The reduced efficiency of operating the reformer over an extended temperature range is more than compensated for by the benefits of extending the rich pulse.

In a method conceived by the inventor, the fuel reformer is heated to a temperature greater than that of the exhaust entering the reformer, typically at least about 50° C. hotter. Over a first period, fuel is provided to the exhaust to make the exhaust rich. The reformer heats during the first period, typically by at least about 75° C. Before the reformer overheats, the provision of fuel is reduced and typically stopped entirely for a second period, over which the reformer cools. The reformer generally cools by at least about 75° C., although it remains hotter than the exhaust, typically at least about 50° C. hotter. While the reformer remains hotter than the exhaust, the actions of making the exhaust rich for a first period over which the reformer heats and making the exhaust lean over a second period over which the reformer cools are repeated.

In another method conceived by the inventor, an internal combustion engine is operated to produce exhaust that passes through a fuel reformer and a LNT arranged in succession. When a need to desulfate the LNT is determined, the exhaust is made rich for a first period in which the reformer produces reformate and heats by at least about 75° C. The exhaust is then made lean for a second period in which the reformer cools by at least about 75° C. These actions are repeated until the LNT has been desulfated to a satisfactory degree.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claim as his invention being reserved for the claims that follow.

DETAILED DESCRIPTION

Figure 1:
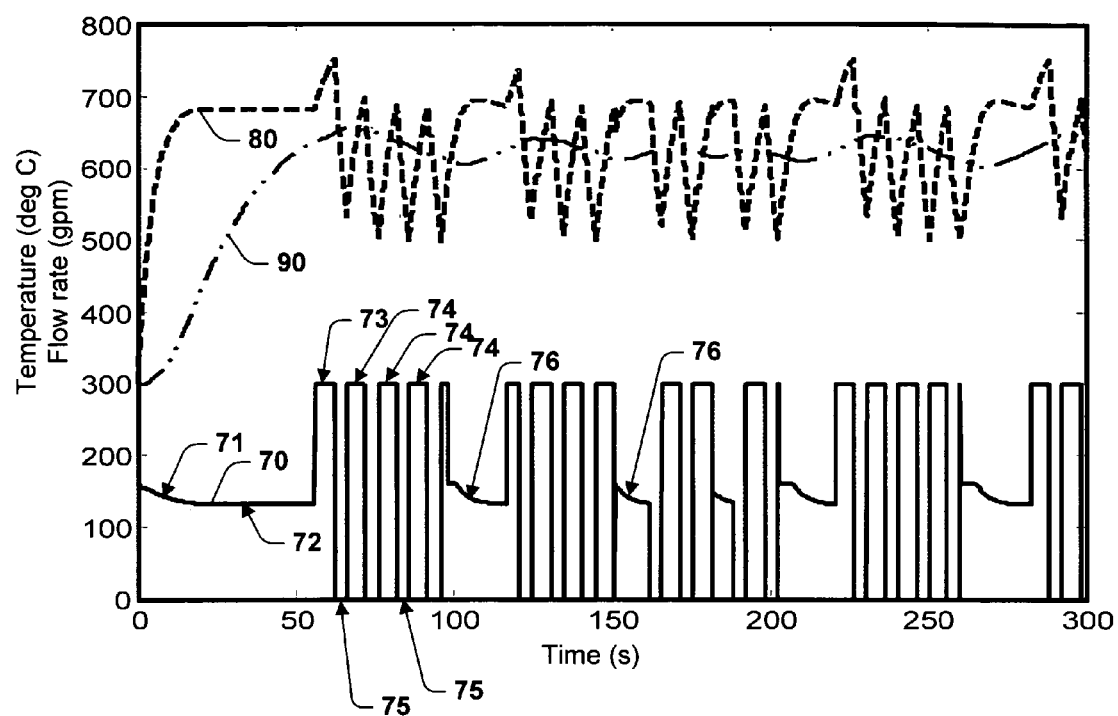
FIG. 1 is a plot of an exemplary fuel injection strategy for LNT desulfation conceived by the inventor.

The inventor has concluded that that the fuel injection pulsing described by the prior art is not optimal for LNT desulfation. Oxygen from lean phases can mix with fuel from rich phases either through convective mixing or adsorption. The inventor's concept is to provide defined, long lasting rich pulses over which the reformer is allowed to heat extensively. The inventor has determined that reformer temperature control is less important than providing discrete rich pulses.

According to the inventor's concept, each rich pulse begins at a relatively low temperature, typically from about 450 to about 550° C. Each pulse is sustained for a relatively long period of time, during which the reformer heats. Between rich pulses, the reformer is allowed to cool. Preferably, no fuel is injected during the cooling periods.

The ideal length of the rich pulses can be determined experimentally and in general reflects a balance between factors. As the length of the pulses increases, there is less of a tendency for reformate to react with oxygen downstream of the reformer, which increases the efficiency of desulfation. On the other hand, progressively extending the lengths of the pulses requires the fuel reformer to operates across progressively larger ranges, which include temperatures above and below what would be considered optimal. The efficiencies across these broad ranges eventually limit the degree to which the rich pulses can be extended.

Preferably, the reformer is allowed to heat by at least about 75° C., more preferably by at least about 100° C., and still more preferably by at least about 150° C. Conversely, the reformer is preferably allowed to cool between rich pulses by at least about 75° C., more preferably by at least about 100° C., and still more preferably by at least about 150° C. The time required for these pulses will depend on such factors as the exhaust flow rate, the exhaust temperature, the exhaust oxygen concentration, and the reformer thermal mass.

As the reformer operation is generally governed by the desire to provide the longest possible rich pulses, the LNT temperature is generally not controlled simultaneously. As a result the LNT will generally heat or cool over a series of pulses, most typically cool. To compensate, the LNT may be periodically reheated by injecting fuel at a rate that leaves the exhaust lean. For example, the LNT may be reheated after it has cooled by about 50° C. or more. During LNT heating, the reformer is typically controlled to a fixed maximum temperature.

A broad temperature range for the reformer operation is particularly desirable when the fuel reformer has a low thermal mass. A low thermal mass reduces the fuel penalty for heating the reformer. Typically, a reformer of the type preferred by the inventor is heated by at least about 50° C., more typically by at least about 100° C. prior to using it to regenerate the LNT. A low thermal mass allows this heating to take place quickly; with a minimum of fuel, however, such a low thermal mass can also lead to rapid heating during reformate production, which in turn tends to give short rich pulses. Thus, the inventor's concept is particularly beneficial when applied to a low thermal mass reformer. In other terms, the inventor's concept is particularly preferable when the reformer heats by at least about 50° C. per second during rich pulses for LNT desulfation, even more so when the reformer heats by at least about 100° C. per second.

FIG. 1 provides an exemplary fuel injection profile according to the inventor's concepts. Line 70 is the fuel injection rate, line 80 is the reformer temperature, and line 90 is the LNT temperature. During a first period indicated by 71, fuel is injected to heat the reformer to a LNT-heating temperature. Over the period 71, the fuel injection rate leaves the exhaust lean.

Over the next period, indicated by 72, the fuel injection rate again leaves the exhaust lean, but in this case keeps the reformer temperature constant. With the reformer temperature constant, the downstream LNT heats to a desulfation temperature. The thermal mass of the LNT is much greater than that of the reformer. Accordingly, period 72 is much longer than period 71. The LNT typically heats to a somewhat lower temperature than the reformer, typically from about 20 to about 50° C. less.

After the LNT has reached a desulfation temperature, a first rich period 73 ensues. This is somewhat shorter than the subsequent rich periods due to the higher starting temperature. Desulfation primarily takes place in the succeeding rich periods 74, during which the reformer heats over a relatively broad range as described above. Between the rich periods 74, the reformer is allowed to cool during period 75, over which there is no fuel injection. Optionally, the reformer can be allowed to cool before the first rich pulse, whereby all the rich pulses can be of the same length.

Periods 76 are used from time-to-time to reheat the LNT, which gradually cools over a series of periods 74 and 75. Period 76 involves maintaining the reformer at a relatively high temperature that heats the downstream LNT.

Figure 2:
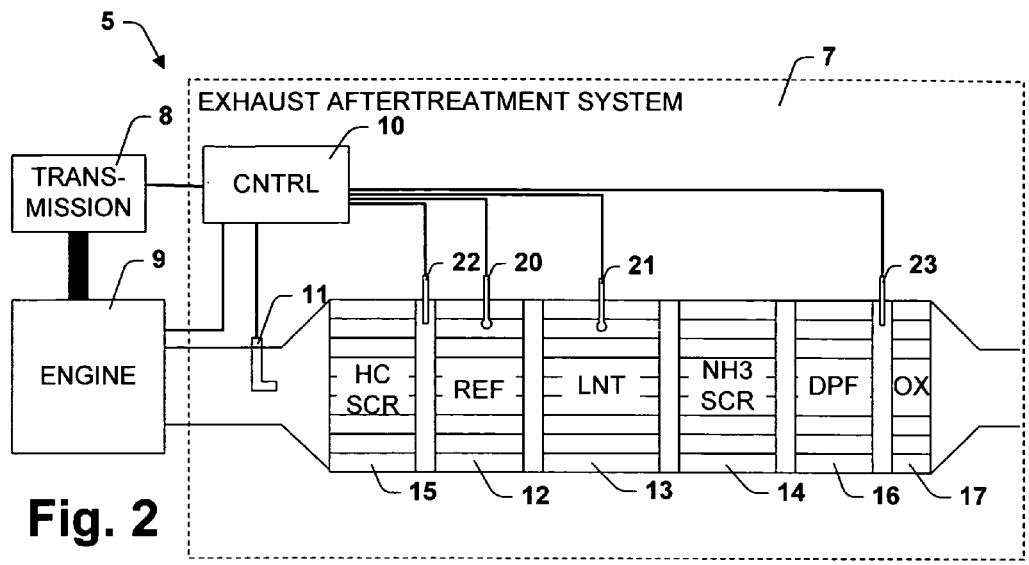
FIG. 2 is a schematic illustration of an exemplary exhaust treatment system in which some concepts of the inventor can be implemented.

FIG. 2 provides a schematic illustration of an exemplary power generation system 5 in which various concepts of the inventor can be implemented. The system 5 comprises an engine 9, a transmission 8, and an exhaust aftertreatment system 7. The exhaust aftertreatment system 7 includes a controller 10, a fuel injector 11, a lean NOx catalyst 15, a reformer 12, a lean NOx-trap (LNT) 13, an ammonia-SCR catalyst 14, a diesel particulate filter (DPF) 16, and a clean-up catalyst 17. The controller 10 receives data from several sources; include temperature sensors 20 and 21 and NOx sensors 22 and 23. The controller 10 may be an engine control unit (ECU) that also controls the transmission 8 and the exhaust aftertreatment system 7 or may include several control units that collectively perform these functions.

The lean-NOx catalyst 15 removes a portion of the NOx from the engine exhaust using reductants, typically hydrocarbons that form part of the exhaust or have been stored by the lean-NOx catalyst 15. The DPF 16 removes particulates from the exhaust. During lean operation (a lean phase), the LNT 13 adsorbs a second portion of the NOx. The ammonia-SCR catalyst 14 may have ammonia stored from a previous regeneration of the LNT 13 (a rich phase). If the ammonia-SCR catalyst 14 contains stored ammonia, it removes a third portion of the NOx from the lean exhaust. The clean-up catalyst 17 may serve to oxidize CO and unburned hydrocarbons remaining in the exhaust.

From time-to-time, the LNT 13 must be regenerated to remove accumulated NOx (denitrated). Denitration may involve heating the reformer 12 to an operational temperature and then injecting fuel using the fuel injector 11. The reformer 12 uses the injected fuel to consume most of the oxygen from the exhaust while producing reformate. The reformate thus produced reduces NOx adsorbed in the LNT 13. Some of this NOx is reduced to $NH_3$, most of which is captured by the ammonia-SCR catalyst 14 and used to reduce NOx during a subsequent lean phase. The clean-up catalyst 17 oxidizes unused reductants and unadsorbed $NH_3$ using stored oxygen or residual oxygen remaining in the exhaust during the rich phases. During regeneration, the lean-NOx catalyst 15 may store reductant for later use.

Figure 3:
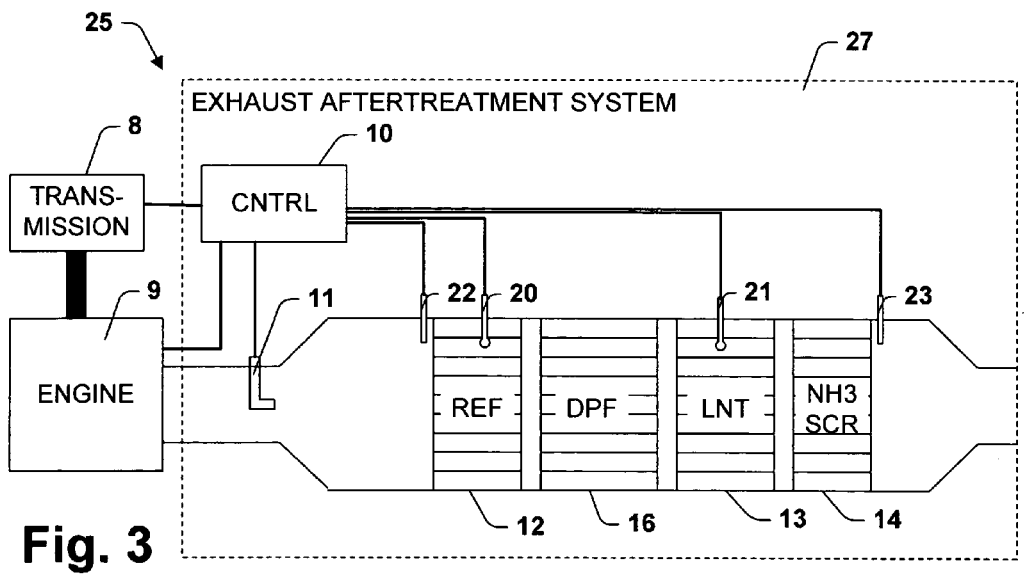
FIG. 3 is a schematic illustration of another exemplary exhaust treatment system in which some concepts of the inventor can be implemented.

FIG. 3 provides another exemplary system 25 to which various concepts of the inventor can be applied. The system 25 contains many of the same components as the system 5, although it does not include the lean NOx catalyst 15 or the cleanup oxidation catalyst 17. One difference is that in the system 25 the DPF 16 is placed between the reformer 12 and the LNT 13. In this position, the DPF 16 may serve to protect the LNT 13 from high temperatures during denitrations by providing a thermal buffer between the reformer 12 and the LNT 13. Reducing the number and/or magnitude of temperature excursions in the LNT 13 may extend the life of the LNT 13.

From time-to-time, the LNT 13 must also be regenerated to remove accumulated sulfur compounds (desulfated). Desulfation involves heating the reformer 12 to an operational temperature, heating the LNT 13 to a desulfating temperature, and providing the heated LNT 13 with a reducing atmosphere. Desulfating temperatures vary, but are typically in the range from about 500 to about 800° C., with optimal temperatures typically in the range from about 650 to about 750° C. Below a minimum temperature, desulfation is very slow. Above a maximum temperature, the LNT 13 may be damaged.

The primary means of heating the LNT 13 is heat convection from the reformer 12. To generate this heat, fuel can be supplied to the reformer 12 under lean conditions, whereby the fuel combusts in the reformer 12.

Optionally, the LNT 13 can also be heated by direct combustion in the LNT 13. Allowing some direct combustion in the LNT 13 reduces the peak temperatures at which the reformer 12 must be operated. One method of achieving direct combustion in the LNT 13 is to design and operate the reformer 12 in such a way that a portion of the fuel supplied to the reformer 12 slips to the LNT 13. For example, the catalyst loading of the reformer 12 or its mass transfer coefficient can be kept low to facilitate this mechanism. Another method of achieving combustion in the LNT 13 is to use rapid cycling between rich and lean phases. Oxygen for the lean phases can mix with fuel or reformate from the rich phases to combust in the LNT 13. This mixing and combustion can be facilitated by a capacity of the LNT 13 to adsorb fuel or oxygen. This type of mixing and combustion used to heat the LNT 13 is minimized during desulfation by extending the length of the lean and rich pulses.

A control system comprising inner and outer loops can be used to independently control the temperatures of the reformer 12 and the LNT 13. The outer loop controls the LNT temperature by issuing instructions to the inner loop, which controls the reformer operation. The reformer operation is controlled primarily though the fuel injection rate. Additional control can involve an intake air throttle for the engine 9 or a torque ratio selection for the transmission 8.

Figure 4:
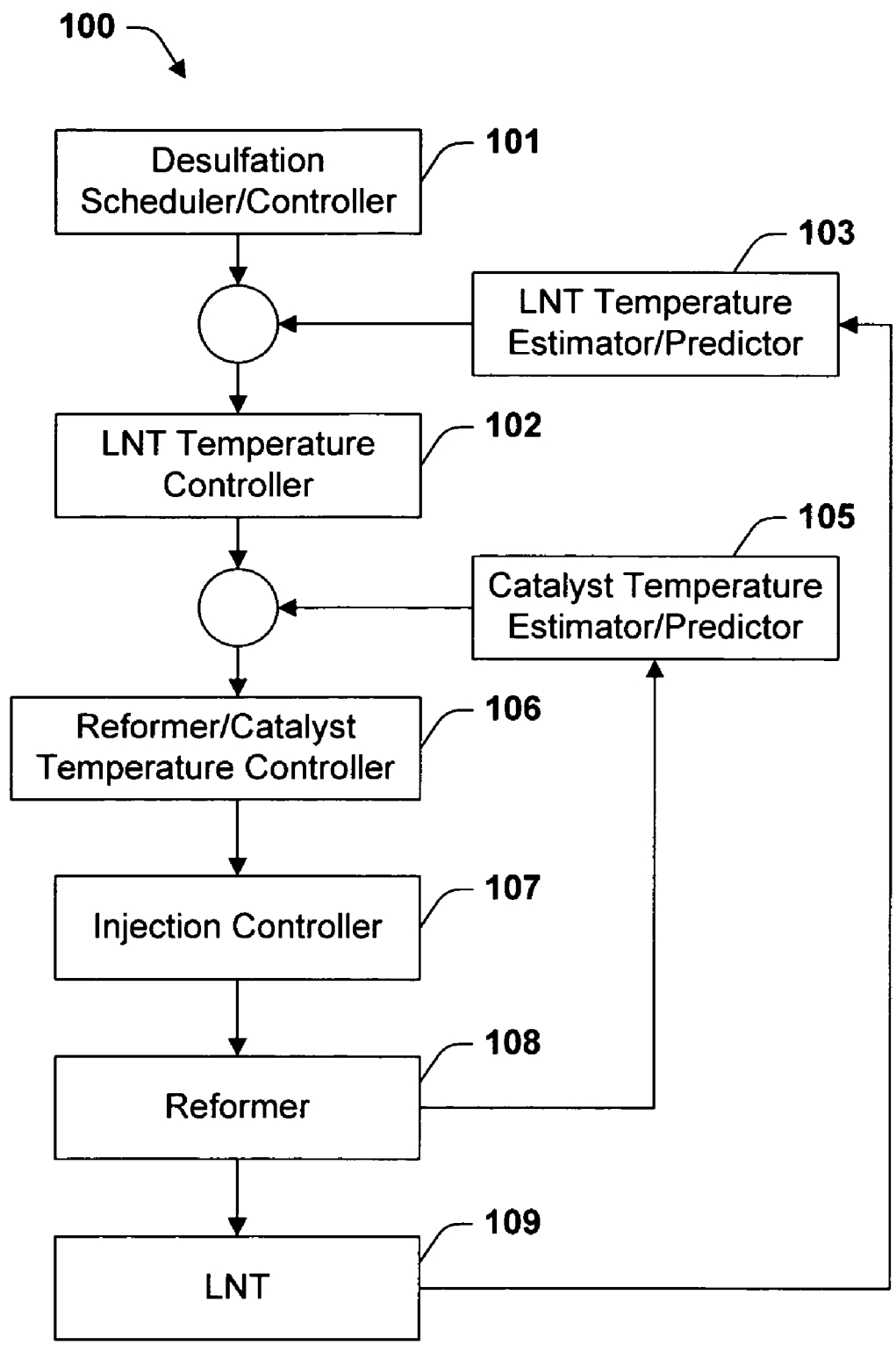
FIG. 4 is a schematic of a control architecture that can be used in implanting some of the inventors' concepts.

FIG. 4 provides a schematic of an exemplary control architecture 100 illustrating inner and outer loop controls. The LNT temperature controller 102 is activated by a desulfation scheduler/controller 101 that applies any appropriate criteria to determine when to initiate a desulfation process. The LNT temperature controller 102 responds to a LNT temperature provided by a state estimator 103. It is preferred to use an observer or state estimator to determine the LNT temperature, because the LNT temperature responds comparatively slowly to controllable parameters. If some form of prediction is not used, there is a risk of the LNT temperature exceeding an intended limit. An extrapolation based on the current measured temperature, its rate of change, and an estimate of the temperature measurement delay is generally sufficient.

The output of the LNT temperature controller 102 is instructions for the reformer controller 106. For example, when the LNT temperature is getting too high, the LNT temperature controller 102 may instruct the reformer controller 106 to shut down the reformer 12 while the LNT 13 cools. When the LNT temperature is in an appropriate range for desulfation, the reformer temperature controller 102 may instruct the reformer controller 106 to produce reformate. When the LNT temperature is too cool, the reformer temperature controller 102 may instruct the reformer controller 106 to operate the reformer 12 in a manner that heats the LNT 13.

In an ideal situation for reformate production, the balance of Equations (1) and (2) provides just enough heat to maintain the reformer temperature. When the oxygen concentration is relatively high, e.g., 5-10% or more, depending on the reformer, there may be a tendency for reaction (1) to dominate whereby the reformer temperature increases to an undesirable degree. Eventually, the reformer 12 must be shutdown to prevent over heating. Once the reformer 12 has cooled, fuel injection can be restarted. The result is that the reformer controller 106 often causes the fuel supply rate to be pulsed in order to maintain the reformer temperature within an acceptable range, particularly when the exhaust oxygen concentration is comparatively high. When the fuel supply rate must be pulsed, it is preferred that the pulse lengths be extended as described herein.

Figure 5:
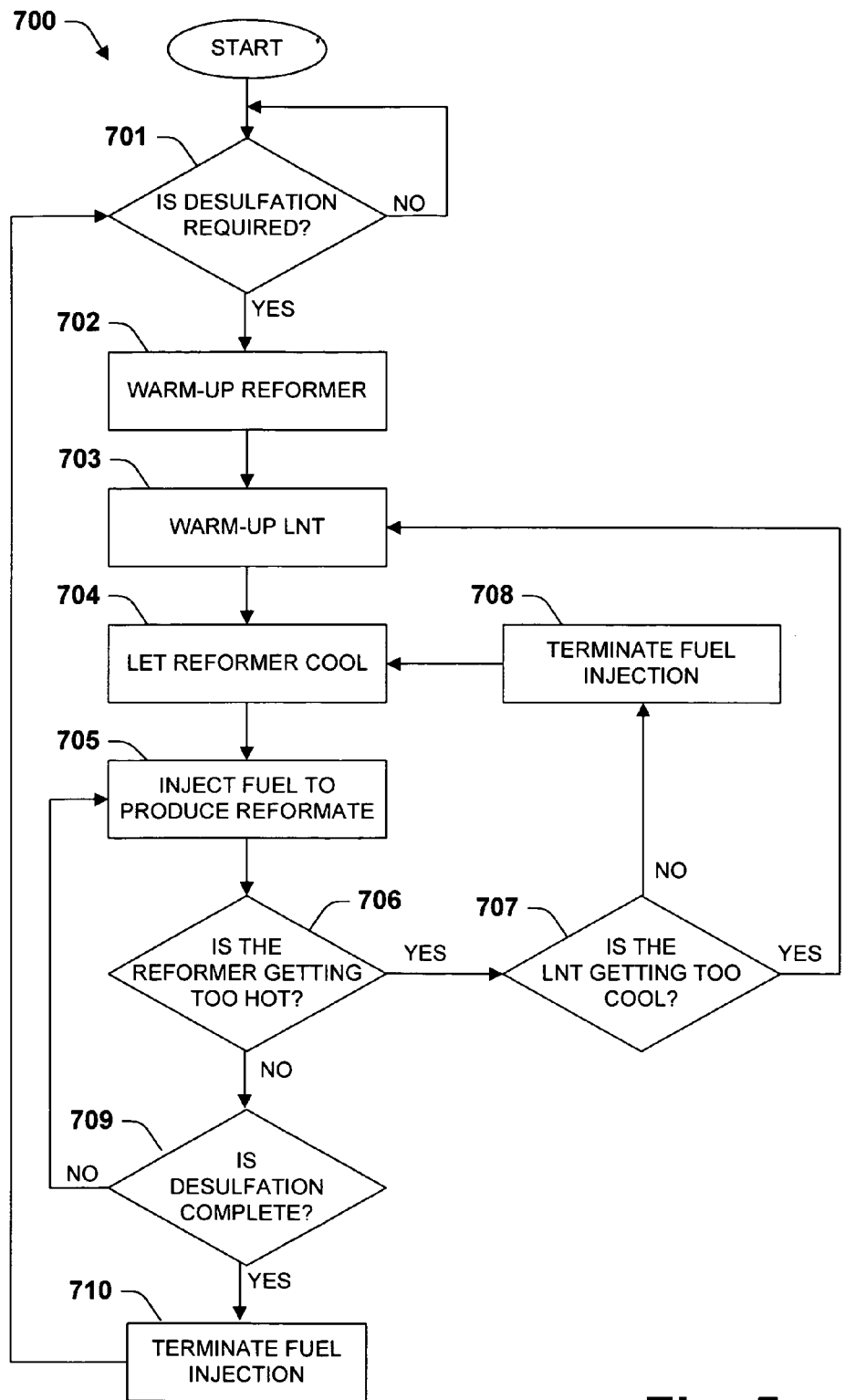
FIG. 5 is a flow chart of an exemplary control process that can be used in implanting some of the inventor's concepts.

FIG. 5 illustrates a control process 700 providing an exemplary implementation of several of the above-described concepts. The process 700 begins with operation 701, determining whether desulfation is required. The determination may be made in any suitable fashion. For example, desulfation may be scheduled periodically, e.g., after every 30 hours of operation. Alternatively, the need for desulfation can be determined based on system performance, e.g., based on the activity of the LNT 13 following an extensive denitration or based on the frequency with which denitration is required having increased to an excessive degree.

The denitration process begins with operation 702, warming the reformer 12. A typical reformer as contemplated herein is one that operates effectively only at temperatures above typical diesel engine exhaust temperatures. The reformer 12 can be heated in any suitable fashion. In this example, the reformer 12 is heated by injecting fuel at a rate that keeps the exhaust at or below a stoichiometric fuel to oxygen ratio. Substantially all the fuel thereby combusts in the reformer 12 to produce heat and there is essentially no reformate production. Alternatively, the reformer 12 could be heated electrically.

The LNT 13 heats while the reformer 12 is heating, but generally requires further heating. In operation 703, at or below stoichiometric operation may be extended to adequately heat the LNT 13. In one example, the LNT 13 is heated to a temperature of at least about 450° C. Heating the LNT 13 may involve relatively short pulses of fuel injection designed to result in combustion within the LNT 13.

In operation 704, the reformer 12 is allowed to cool. The reformer 12 may be cooled to below an optimal temperature for reformate production in order to allow an extended rich pulse. Typically, the reformer 12 will be cooled to a temperature from about 450 to about 550° C.

Operation 705 is injecting fuel at rates that leave the exhaust rich and cause reformate production in the reformer 12. The fuel injection rate may be optimized to give a maximum ratio between reformate production and fuel expended. Where the controller 10 can throttle the engine air intake or select the transmission gear ratio, these control parameters can be selected to facilitate the efficient production and/or usage of the reformate.

Operation 706 determines whether the reformer 12 is overheating. Preferably, the reformer temperature for this purpose is a delay-free estimate. For example, such an estimate can be made with information from a temperature sensor in the reformer 12 or in the exhaust immediately downstream of the reformer 12. Forming the estimate can involve a simple extrapolation, or can be accomplished using an observer, such as a Kalman filter or a sliding mode observer. An observer preferably comprises a model that takes into account hydrocarbon adsorption in the reformer 12. It has been observed that hydrocarbon adsorption in the reformer 12 can cause the temperature of the reformer 12 to increase significantly after the fuel supply is shut off. The reformer temperature can also overshoot significantly due to the delay in receiving temperature measurements unless delay-free estimates are used.

If operation 706 determines the reformer 12 is overheating, the process 700 checks in operation 707 whether the LNT 13 is getting too cool. A delay-free estimate can be used for the LNT temperature. If the LNT 13 is getting too cool, the warm-up operation 703 is repeated. Initiating this operation while the reformer 12 is at its peak temperature eliminates the need to heat the reformer 12.

If operation 707 determines the LNT 13 is not getting too cool, fuel injection is terminated in operation 708 and the reformer is allowed to cool in operation 704 in preparation for another long rich pulse. The length of the waiting period can be determined in any suitable fashion. In one example, operation 706 lasts until the reformer 12 has cooled to a target temperature. In another example, there is a fixed cooling period.

If operation 706 determines that the reformer 12 is not overheating, operation 709 is used to determine whether desulfation in complete. The end of a desulfation process can be determined in any suitable fashion. In one example, desulfation is carried out for a fixed period of time. In another example, an estimate of the amount of sulfur stored in the LNT 13 is maintained and desulfation is terminated when this estimate indicates a sufficiently low level. In a further embodiment, desulfation is terminated after a certain amount of reductant has been supplied to the LNT 13. In a still further embodiment, desulfation is terminated based on a determination that the sulfur concentration downstream of the LNT 13 during a rich phase has dropped to a certain level. If desulfation is not complete, reformate production is continued in operation 705. When desulfation is complete, fuel injection is terminated in operation 710.

While the engine 9 is preferably a compression ignition diesel engine, the various concepts of the inventor are applicable to power generation systems with lean-burn gasoline engines or any other type of engine that produces an oxygen rich, NOx-containing exhaust. For purposes of the present disclosure, NOx consists of NO and $NO_2$.

The transmission 8 can be any suitable type of transmission. The transmission 8 can be a conventional transmission such as a counter-shaft type mechanical transmission, but is preferably a CVT. A CVT can provide a much larger selection of operating points than a conventional transmission and generally also provides a broader range of torque multipliers. In general, a CVT will also avoid or minimize interruptions in power transmission during shifting. Examples of CVT systems include hydrostatic transmissions; rolling contact traction drives; overrunning clutch designs; electrics; multispeed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel injector 11 can be of any suitable type. Preferably, it provides the fuel in an atomized or vaporized spray. The fuel may be injected at the pressure provided by a fuel pump for the engine 9. Preferably, however, the fuel passes through a pressure intensifier operating on hydraulic principles to at least double the fuel pressure from that provided by the fuel pump to provide the fuel at a pressure of at least about 4 bar.

The lean-NOx catalyst 15 can be either an HC-SCR catalyst, a CO-SCR catalyst, or a $H_2$-SCR catalyst. Examples of HC-SCR catalysts include transitional metals loaded on refractory oxides or exchanged into zeolites. Examples of transition metals include copper, chromium, iron, cobalt, nickel, cadmium, silver, gold, iridium, platinum and manganese, and mixtures thereof. Exemplary of refractory oxides include alumina, zirconia, silica-alumina, and titania. Useful zeolites include ZSM-5, Y zeolites, Mordenite, and Ferrerite. Preferred zeolites have Si:Al ratios greater than about 5, optionally greater than about 20. Specific examples of zeolite-based HC-SCR catalysts include Cu-ZSM-5, Fe-ZSM-5, and Co-ZSM-5. A $CeO_2$ coating may reduce water and $SO_2$ deactivation of these catalysts. Cu/ZSM-5 is effective in the temperature range from about 300 to about 450° C. Specific examples of refractory oxide-based catalysts include alumina-supported silver. Two or more catalysts can be combined to extend the effective temperature window.

Where a hydrocarbon-storing function is desired, zeolites can be effective. U.S. Pat. No. 6,202,407 describes HC-SCR catalysts that have a hydrocarbon storing function. The catalysts are amphoteric metal oxides. The metal oxides are amphoteric in the sense of showing reactivity with both acids and bases. Specific examples include gamma-alumina, $Ga_2O_3$, and $ZrO_2$. Precious metals are optional. Where precious metals are used, the less expensive precious metals such as Cu, Ni, or Sn can be used instead of Pt, Pd, or Rh.

In the present disclosure, the term hydrocarbon is inclusive of all species consisting essentially of hydrogen and carbon atoms, however, a HC-SCR catalyst does not need to show activity with respect to every hydrocarbon molecule. For example, some HC-SCR catalysts will be better adapted to utilizing short-chain hydrocarbons and HC-SCR catalysts in general are not expected to show substantial activity with respect to $CH_4$.

Examples of CO-SCR catalysts include precious metals on refractory oxide supports. Specific examples include Rh on a $CeO_2$-$ZrO_2$ support and Cu and/or $FeZrO_2$ support.

Examples of $H_2$-SCR catalysts also include precious metals on refractory oxide supports. Specific examples include Pt supported on mixed $LaMnO_3$, $CeO_2$, and $MnO_2$, Pt supported on mixed $ZiO_2$ and $TiO_2$, Ru supported on MgO, and Ru supported on $Al_2O_3$.

The lean-NOx catalyst 15 can be positioned differently from illustrated in FIG. 1. In one embodiment, the lean NOx catalyst 15 is upstream of the fuel injector 11. In another embodiment the lean NOx catalyst is downstream of the reformer 12, whereby the lean NOx catalyst 15 can use reformer products as reductants. In a further embodiment, the lean NOx catalyst 15 is well downstream of the LNT 13, whereby the lean NOx catalyst 15 can be protected from high temperatures associated with desulfating the LNT 13.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer comprising a steam reforming catalyst. Examples of reformer catalysts include precious metals, such as Pt, Pd, and Rh, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 450° C. The reformer is generally operative at temperatures from about 450 to about 1100° C.

The LNT 13 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The absorbent is typically combined with a binder and either formed into a self-supporting structure or applied as a coating over an inert substrate.

The LNT 13 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust systems must be reasonably resistant to degradation under the vibrations encountered during vehicle operation.

The ammonia-SCR catalyst 14 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 14 is designed to tolerate temperatures required to desulfate the LNT 13.

The particulate filter 16 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less.

The location of the DPF 16 is optional. Between the reformer 12 and the LNT 13, the DPF 16 can serve to protect the LNT 13 from temperature excursions associated with the operation of the reformer 12. Between the LNT 13 and the ammonia-SCR catalyst 14, the DPF 16 can help protect the SCR catalyst 14 from desulfation temperatures. Optionally, one or more of the reformer 12, the LNT 13, and the ammonia-SCR catalyst 14 is integrated as a coating or within the structure of the DPF 16.

The DPF 16 is regenerated to remove accumulated soot. The DPF 16 can be of the type that is regenerated continuously or intermittently. For intermittent regeneration, the DPF 16 is heated, using a reformer 12 for example. The DPF 16 is heated to a temperature at which accumulated soot combusts with $O_2$. This temperature can be lowered by providing the DPF 16 with a suitable catalyst. After the DPF 16 is heated, soot is combusted in an oxygen rich environment.

For continuous regeneration, the DPF 16 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, Nd, Pt, and Pd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 16 is suitably placed upstream of the reformer 12. Where the DPF 16 is not continuously regenerated, it is generally positioned downstream of the reformer 12.

The clean-up catalyst 17 is preferably functional to oxidize unburned hydrocarbons from the engine 9, unused reductants, and any $H_2S$ released from the NOx absorber-catalyst 13 and not oxidized by the ammonia-SCR catalyst 14 or the additional catalyst 14. Any suitable oxidation catalyst can be used. To allow the clean-up catalyst 17 to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

I claim:

1. A method of desulfating a LNT configured downstream of a fuel reformer, comprising:

operating an internal combustion engine to produce exhaust;

introducing the exhaust to a fuel reformer;

heating the fuel reformer to a temperature at least about 50° C. hotter than the exhaust;

providing fuel to the exhaust to make the exhaust rich for a first period over which the reformer heats by at least about 75° C.;

reducing or terminating the provision of fuel to the exhaust to make the exhaust lean for a second period over which the reformer cools by at least about 75° C. while remaining at least about 50° C. hotter than the exhaust; and while the reformer remains at least about 50° C. hotter than the exhaust, repeating the actions of making the exhaust rich for a period over which the reformer heats by at least about 75° C. and making the exhaust lean for a period over which the reformer cools by at least about 75° C.

2. The method of claim 1, wherein the fuel reformer is designed with thin metal walls for low thermal mass.

3. The method of claim 1, wherein the LNT cools over each collective first and second period.

4. The method of claim 3, wherein the LNT is reheated, from time-to-time, by injecting fuel into the exhaust upstream of the reformer at rates that leaves the exhaust lean.

5. The method of claim 1, wherein the reformer heats by at least about 100° C. over each first period.

6. The method of claim 1, wherein the reformer heats by at least about 150° C. over each first period.

7. The method of claim 1, wherein the reformer heats by at least about 50° C. per second over each first period.

8. The method of claim 1, wherein the reformer heats by at least about 100° C. per second over each first period.

9. An exhaust aftertreatment system comprising a controller configured to implement the method of claim 1.

10. A vehicle comprising an exhaust aftertreatment system and a controller configured to implement the method of claim 1.

* * * * *